United States Patent [19]

Benkeser et al.

[11] Patent Number: 5,361,362
[45] Date of Patent: Nov. 1, 1994

[54] ADAPTIVE JOB SCHEDULING FOR MULTIPROCESSING SYSTEMS WITH MASTER AND SLAVE PROCESSORS EXECUTING TASKS WITH OPPOSITE ANTICIPATED EXECUTION TIMES RESPECTIVELY

[75] Inventors: Donald E. Benkeser, Naperville; Joseph B. Cyr, Aurora, both of Ill.; Albert G. Greenberg, Millburn; Paul E. Wright, Basking Ridge, both of N.J.

[73] Assignee: AT&T Bell Laboratories, Murray Hill, N.J.

[21] Appl. No.: 971,710

[22] Filed: Nov. 4, 1992

Related U.S. Application Data

[63] Continuation of Ser. No. 315,006, Feb. 24, 1989, abandoned.

[51] Int. Cl.⁵ .................... G06F 15/16; G06F 9/46
[52] U.S. Cl. .................... 395/725; 395/650; 364/281.3; 364/281.4; 364/281.0; 364/281.6; 364/281.7; 364/281.8; 364/284.1; 364/DIG. 1
[58] Field of Search .................. 364/DIG. 1, DIG. 2; 395/200, 250, 650, 725

[56] References Cited

U.S. PATENT DOCUMENTS

| | | | |
|---|---|---|---|
| 3,648,253 | 3/1972 | Mullery et al. | 364/200 |
| 4,318,173 | 3/1982 | Freedman et al. | 364/200 |
| 4,333,144 | 6/1982 | Whiteside et al. | 364/200 |
| 4,394,727 | 7/1983 | Hoffman et al. | 364/200 |
| 4,403,286 | 9/1983 | Fry et al. | 364/200 |
| 4,633,387 | 12/1986 | Hartung et al. | 364/200 |
| 4,736,318 | 4/1988 | Delyani et al. | 364/200 |
| 4,839,798 | 6/1989 | Eguchi et al. | 364/200 |
| 4,852,001 | 7/1989 | Tsushima et al. | 364/401 |
| 4,908,750 | 3/1990 | Jablow | 364/200 |
| 4,953,082 | 8/1990 | Nomura et al. | 395/650 |
| 4,954,945 | 9/1990 | Inoue | 395/600 |
| 4,989,133 | 1/1991 | May et al. | 364/200 |
| 5,050,070 | 9/1991 | Chastain et al. | 364/200 |
| 5,109,329 | 4/1992 | Strelioff | 395/725 |

OTHER PUBLICATIONS

G. H. Goble and M. H. Marsh, "A Dual Processor Vax 11/780", Technical Report, TR-EE-81-31, School of Electrical Engineering, Purdue University, West Lafayette, Indiana, Sep., 1981.
M. J. Bach, *The Design of the UNIX ® Operating System*, New Jersey, Prentice-Hall, Inc., 1986, pp. 391-411.

*Primary Examiner*—Thomas C. Lee
*Assistant Examiner*—Maria Von Buhr
*Attorney, Agent, or Firm*—Werner Ulrich

[57] ABSTRACT

In a master/slave multiprocessor system, process execution tasks are allocated on the basis of anticipated execution time. Work which can be performed by either the master or the slave is entered on a double ended queue in a non-descending order of anticipated execution times. Processes having high anticipated execution times are selected for execution by the slave processor and processes having low anticipated execution times are selected for execution by the master processor. Anticipated holding times are computed on the basis of the time spent by the slave computer in the execution of a segment of a process without requiring interaction with the master processor. The slave processor records the time spent in execution each time a segment of the process is completed and the process has to be returned to the master. The master uses the recorded time as a measure of the anticipated execution time for a next segment of the same process.

4 Claims, 4 Drawing Sheets

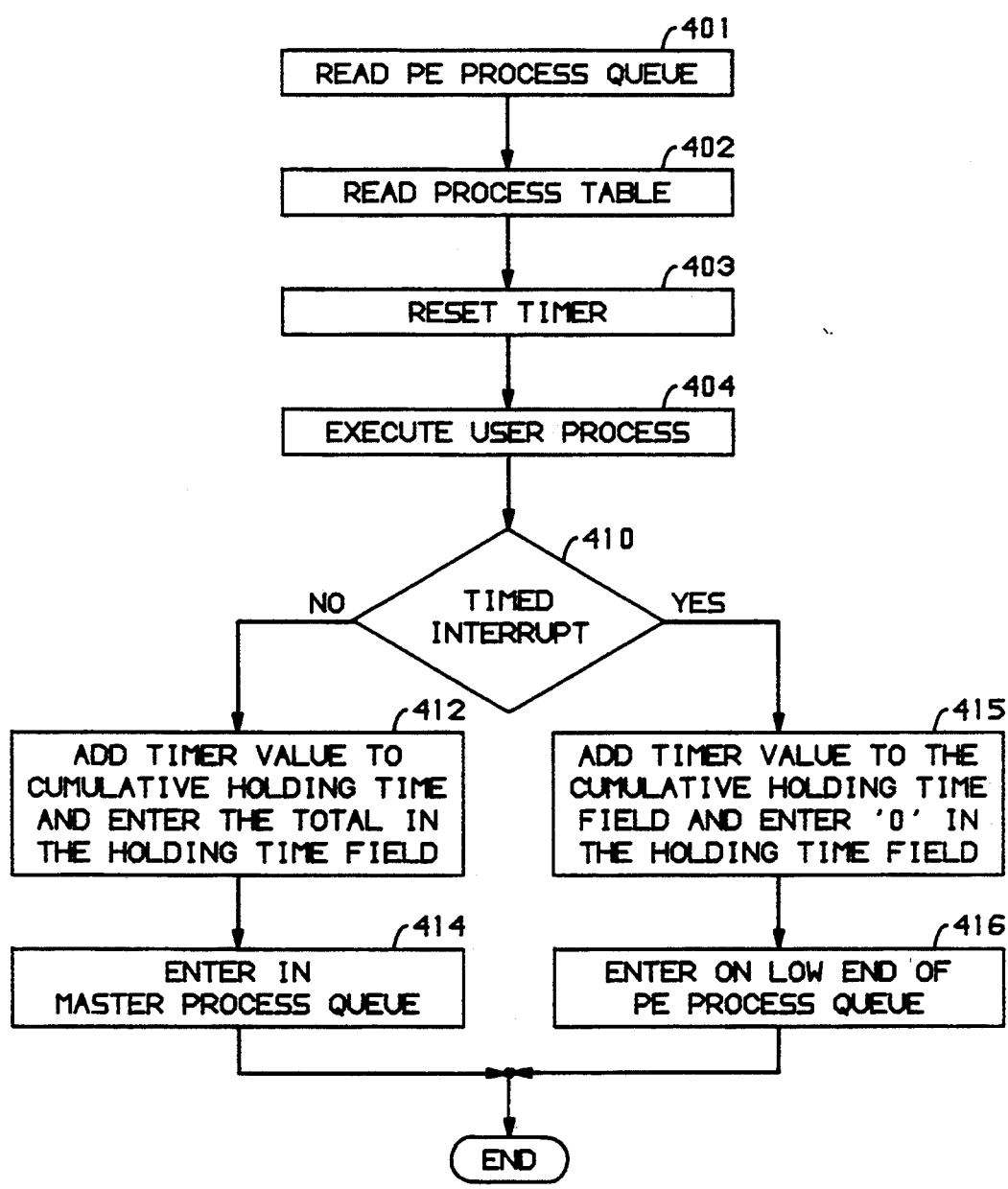

ADAPTIVE JOB SCHEDULING FOR MULTIPROCESSING SYSTEMS WITH MASTER AND SLAVE PROCESSORS EXECUTING TASKS WITH OPPOSITE ANTICIPATED EXECUTION TIMES RESPECTIVELY

This application is a continuation of application Ser. No. 315,006, filed on Feb. 24, 1989, now abandoned.

FIELD OF INVENTION

This invention relates to multiprocessor systems and more particularly to a scheme for allocating work among the processors of a multiprocessor system.

BACKGROUND OF THE INVENTION

One known multiprocessor system configuration has a master processor which handles system level functions, such as those requiring communications with input/output devices or access to bulk storage devices such as disks and tapes, while other processing elements perform other computational functions and return an assigned job to the master processor when such a system level function is encountered. In some software systems approximately half of the execution time is spent on such system level functions. It might be assumed, therefore, that in such a system a two processor master/slave arrangement would have nearly twice the processing power as its one processor counterpart. Under certain circumstances, however, the addition of a slave processor may increase the total processing power by much less than 100 percent, sometimes less than 50 percent. One reason for this is the under utilization of the slave processors. The processing of a user transaction by a multiple processor system typically involves the selection by the master processor of program instructions and data necessary to carry out the assigned work. This is referred to as the creation of a process. The master may transfer the created process to a slave processor for execution. The slave processor executes the process until a system level function is encountered which the slave processor cannot handle, and transfers the process back to the master. The master may execute the appropriate system level function and transfer the process back to the slave for further execution. The amount of time used in what is sometimes referred to as context switching, i.e. the transferring of processes between processors and performing related start up activities, may reduce substantially the time available for process execution. This is especially true for jobs requiring frequent master processor interaction.

Thus, a problem of the prior art is making efficient and cost effective use of the processing power of the equipment in a multiprocessor system. In one prior art arrangement, the master processor communicates with multiple slave processors via separate queues and load balancing is accomplished by placing new tasks on the shortest queue. However, this does not eliminate the bottleneck resulting from frequent context switching.

In other prior art multiprocessor arrangements, there are the equivalent of two or more masters each having a specifically assigned task such as communicating with certain types of input/output devices in order to avoid bottlenecks and to increase processor utilization. Such a system has inherent complexities, however in that each of the several processors must have input/output capability, thereby diminishing the advantages of a master-slave multiprocessor system.

SUMMARY OF THE INVENTION

These and other problems of the prior art are solved and an advance is made in accordance with the principle of this invention by using the execution characteristics of the processes to allocate work between the processors of a multiprocessor system on the basis of the length of time the process is expected to run without switching the process between processors. In accordance with one embodiment of the invention, program processes having execution characteristics such that they are expected to run for relatively longer periods of time before having to be switched are assigned to one type of processor of the multiprocessing system and processes having execution characteristics such that they are expected to run for relatively shorter periods of time before having to be switched are assigned to another type of processor of the multiprocessor system. In an illustrative master/slave multiprocessor system where only the master performs certain system level functions, processes having relatively longer anticipated time periods between such system level functions are assigned to slave processors, while processes having relatively shorter anticipated time periods between such system level functions are assigned to the master. Advantageously, this scheme reduces context switching and improves the utilization of slave processors. As a result, it provides greater system processing power for a given number of slave processors.

In accordance with one embodiment of the invention, the time spent in the execution of a segment of a process not involving system level functions assigned to the master processor is used as the anticipated execution time for the next such segment of the same process. Each time such a segment of a process is executed, an indication of the segment holding time i.e. the time spent in executing the segment, is recorded together with the identity of the associated process. This holding time remains associated with the process until a next such segment is to be executed and becomes a criterion for subsequent assignment of the process to one of the processors. Alternatively, the average holding time or the maximum holding time of several of the most recently executed segments of a process may be used as the anticipated holding time of a next segment of the same process.

In accordance with a particular embodiment of the invention, the master processor enters processes to be executed in a double ended queue in a non-descending order of holding times. The slave processor executes the processes with the longer recorded holding times from one end of the queue and the master processor executes processes with the shorter recorded holding times from the other end of the queue. The slave processor executes a process until one of the functions assigned to the master is required. The slave processor enters such a partially executed process on a master process queue together with an indication of the holding time for the executed segment. The master processor removes the process from the master process queue, performs the required functions and reenters the process on the double ended queue in a position which corresponds to the holding time value recorded in the master process queue by the slave processor. The scheme of this invention is equally applicable in a system of several slave processors or several master processors.

In accordance with another aspect of the invention, long duration process segments executed by the slave processor may be interrupted periodically and holding time values may be computed representing the accumulated holding times of a plurality of time periods spent in executing a segment of a process. Advantageously, such periodic interruption may be used to prevent shorter holding time processes from being unduly delayed.

BRIEF DESCRIPTION OF THE DRAWING

FIG. 4 is a flowchart representation of process execution by one of the processors.

DETAILED DESCRIPTION

Figure 1:
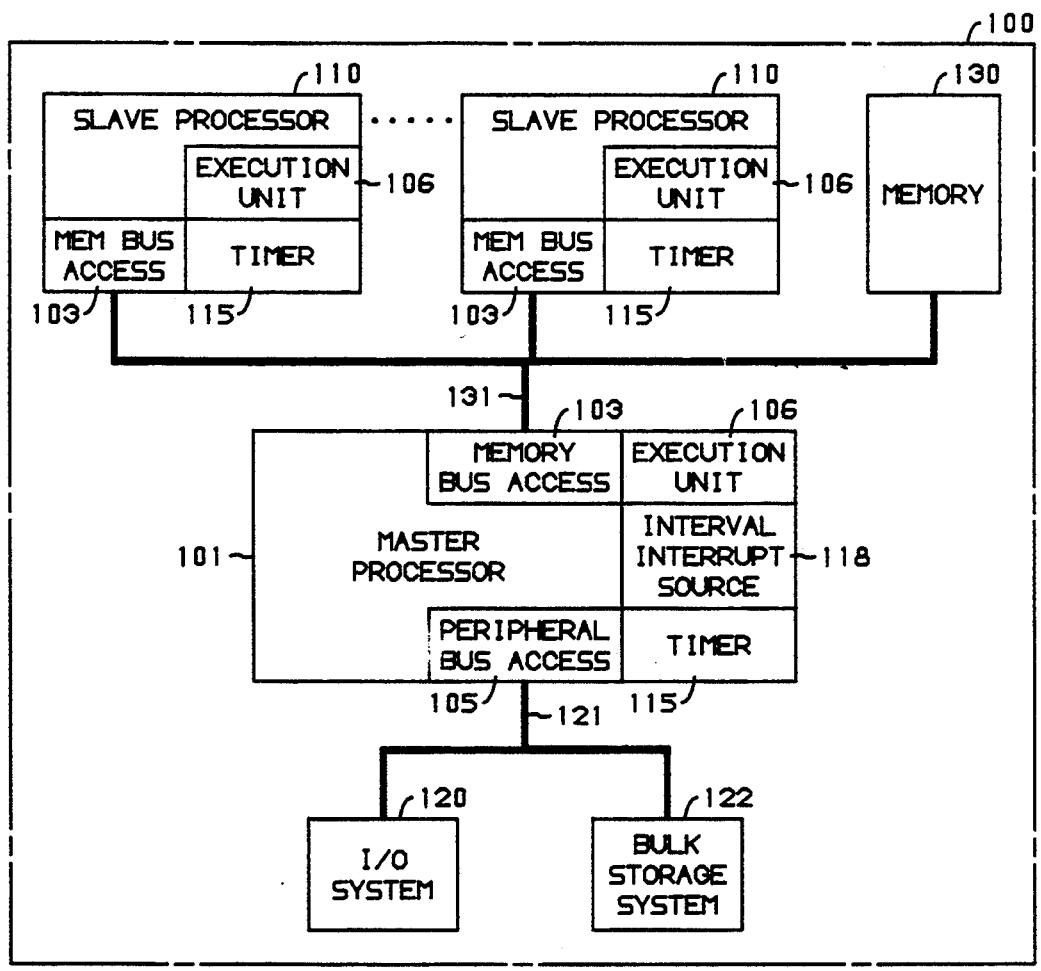
FIG. 1 is a block diagram representation of a multiprocessor system employed in the illustrative embodiment of the invention.

FIG. 1 is a block diagram representation of an illustrative multiprocessing computer 100 in which the invention may be utilized. The system comprises a master processor 101 and a plurality of processing elements, also referred to as slave processors 110. By means of a peripheral bus 121, the master processor 101 has access to a peripheral system comprising an input/output system 120 which includes input/output terminals, and a bulk storage system 122, which includes disk and tape bulk storage devices.

A user of the system communicates with the computer 100 via terminals of the input/output system 120. All terminal transactions with the user are handled by the master processor 101, which functions under control of an operating system such as the well-known AT&T UNIX ® operating system. The master processor performs all the operating system level functions involving input/output transactions and the transfer of information between the memory 130 and the bulk storage system 122. While the slave processors 110 may perform some operating system level functions on the execution of a process, they do not perform any functions requiring access to the peripheral bus 121. Such functions are performed exclusively by the master. The master processor 101 and the slave processors 110 each have access to a shared memory 130 via memory access bus 131. The memory 130 stores the system's operating system as well as system queues and user processes. Processor 101 and slave processor elements 110 may each be a well-known data processor such as the commercially available AT&T 3B2 processor and may be connected to suitable, commercially available memory system and peripheral equipment. The master processor 101 and the slave processors 110 each comprise a memory bus access circuit 103, for accessing bus 131, an execution unit 106 for executing instructions, and a timer circuit 115 used in computing holding time values. In addition, the master processor 101 includes a peripheral bus access circuit 105 for accessing bus 121, and an interval interrupt source 118 used to provide a periodic program interrupt, e.g. once every 10 milliseconds.

Figure 2:
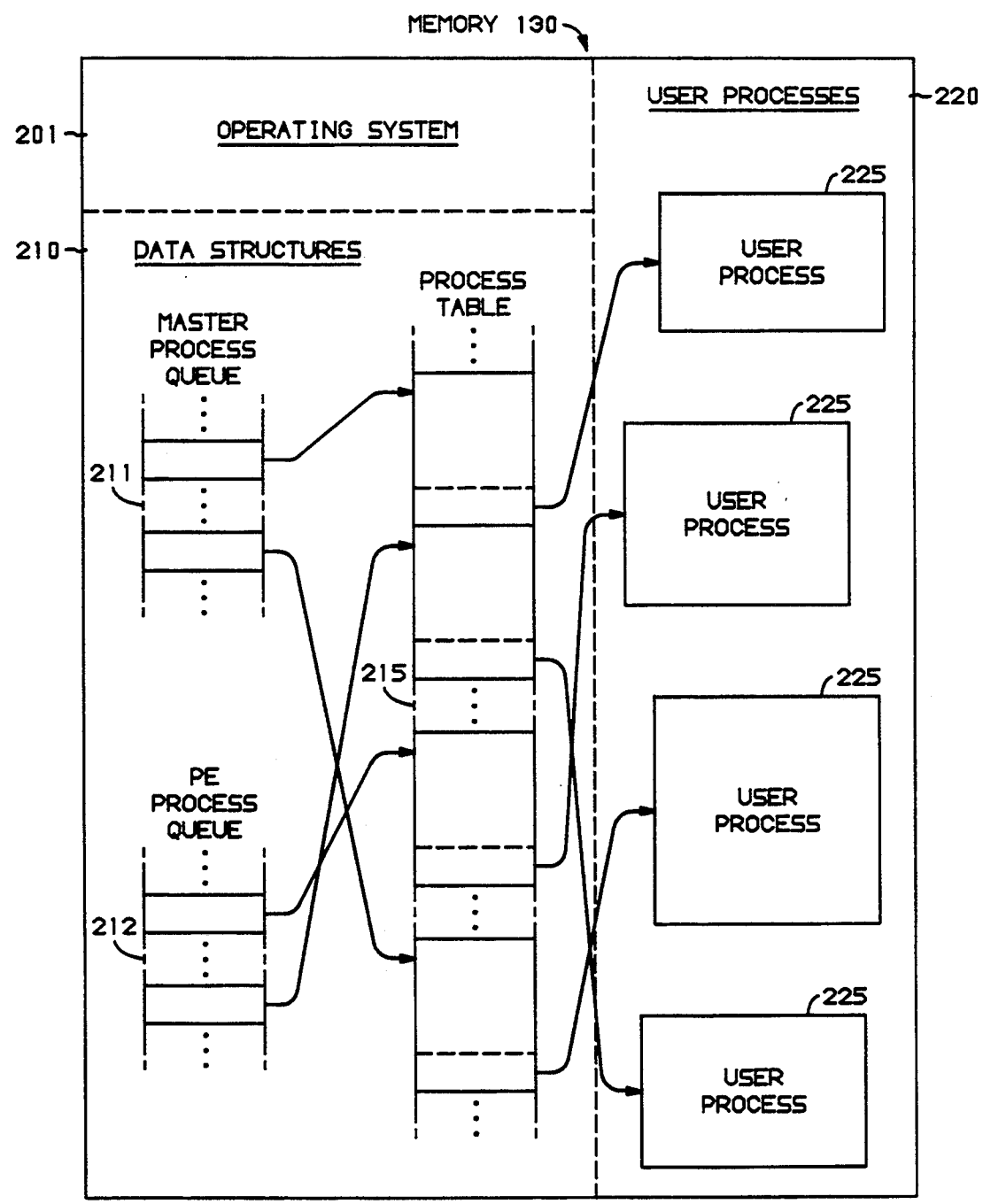
FIG. 2 is a symbolic memory layout of the memory of the multiprocessor system of FIG. 1.

FIG. 2 is a symbolic memory layout of the memory 130. The memory is divided into three basic areas, an area 201 for storing operating system instructions, an area 210 for storing operating system data structures and an area 220 for storing user processes. The functions of the master processor 101 include the creation of user processes 225 which are stored in the User Process area 220 for execution either by the master processor 101 or one of the processing elements 110. The Data Structures area 210 is used to store a PE Process queue 212 in which the master processor 101 enters the identity of processes to be executed. Processes requiring execution by the master processor 101 are entered on the Master Process queue 211. Entries in these queues point to areas of a process table 215 which contains information about a corresponding user process, including the location in the User Process area 220 where the process is stored. While FIG. 2 represents the queues as separate storage areas in the memory 130, the queuing function may also be achieved through integration of the queues in the process table 215 by means of a queue linking mechanism.

When a command is received from a user via the input terminals of the I/O system 120, the master processor 101, by execution of instructions at the operating system stored in area 201 creates a user process. This includes the transfer of data and instruction sequences from disk or tape of the storage system 122 to the User Process area 220, in the form of a user process 225. An entry will be made in the Process table 215 defining the newly created process and identifying the memory location where the associated user process has been stored. The master processor 101 will also make an entry in the PE Process queue 212 pointing to the position in the process table 215 where the process information has been stored. Both the master processor 101 and the slave processors 110 may execute processes from this queue.

As stated earlier, in the illustrative multiprocessing system of FIG. 1 the slave processors 110 do not have access to the peripheral bus 121 and hence cannot perform peripheral system functions i.e. functions requiring access to the I/O system 120 or the bulk storage system 122. Thus, in executing a process, they can continue only so long as there are no such functions to be executed. When such a function is encountered by a slave processor executing a process obtained from PE Process queue 212, the process is entered on the Master Process queue 211 by the slave processor. The master processor 101 will fetch the process from the Master queue 211, execute the necessary functions and return the process to the PE Process queue. This exchange continues until the process is completed. In order to accomplish a distribution of work such that the slave processors 110 will execute those processes that will run for relative longer times without requiring action by the master processor, the master processor 101 segregates the processes in the PE Process queue 212 on the basis of anticipated execution time. More specifically, processes are entered on queue in a non-descending order of holding time values. Thus, processes having longer recorded holding times will be found at one end of the queue and those having shorter recorded holding times at the other end of the queue. The slave processors 110 will remove processes from the end of the queue having the longer holding times while the master processor 101 will take processes having the shorter holding times. This approach has been shown empirically to significantly increase the utilization of the slave processors and the processing power of a computer with a given number of slaves.

Each time a segment of a process is executed by a slave processor, a holding time value representative of the time spent in execution is computed and is entered in the Master Processor queue 211, together with information identifying the process, upon completion of the segment. When the process is reentered on the PE Process queue, after completion of system level work by master processor 101, the previously computed holding time value is taken as the anticipated holding time for the next segment and is used in inserting the process in the queue. Alternatively, the master processor may record the computed holding time values of several executed segments of a process and take the maximum or average of holding the values of, for example, the three most recently executed segments as the anticipated holding time for a next segment of the same process. Algorithms for computing such average or maximum values are readily available.

When a partially executed process is entered on the Master Process queue by a slave processor, the partially executed process is taken from this queue by the master on a high priority basis. For example, the master processor 101 will preempt work which can be handled by one of the slave processors 110 in order to execute the necessary system level functions on the newly entered process. This scheme is used to reduce a bottleneck which might otherwise result from a long Master Process queue. One algorithm for loading the PE Process queue 212 is for the master processor to enter a process in the PE Process queue as soon as it starts work that can execute on any of the processors. Alternately, the master processor begins to execute a process until it is preempted by another process, at which point the previous process is entered on the PE Process queue 212. The choice as to which of these schemes is used may depend on the workload of the master processor. When a newly created process is first placed on the PE Process queue, the holding time value is set to zero, making it more likely that the new process will be first handled by the master. Other initial values for holding time can also be used. The master processor 101 includes a clock 115 and the slave processors 110 each include a clock 115. This may be by way of example, a commercially available hardware timer circuit, which includes a software addressable counter register. The timer circuit will be incremented by the hardware on a periodic basis, for example, once every 10 microseconds. Upon initiation of execution of one of the processes on the PE Process queue 212, the executing processor resets its hardware timer counter register. When the process is returned to the Master Process queue 211 for further system level processing, the value of the counter register is included to reflect the holding time.

Figure 3:
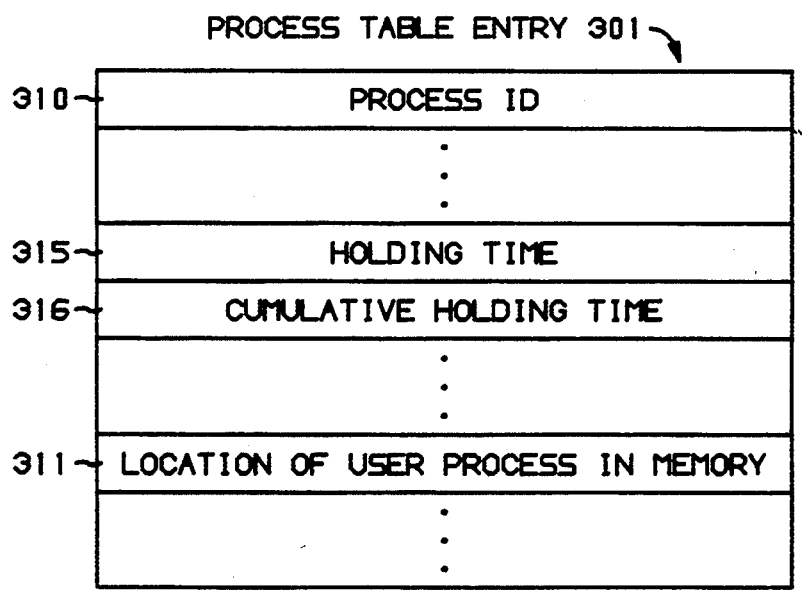
FIG. 3 is a representation of an illustrative table entry in the memory of FIG. 2.

FIG. 3 is a representation of an illustrative entry 301 in the Master Process queue and the PE Process queue. Besides field 310, used for process identification, it includes a field 311 identifying the location of the corresponding user process in the User Process area 220. The entry also includes a field 315 for recording the holding time value. The contents of the holding time field 315 are used by the master processor in ordering processes on the PE Process queue 212 in a non-descending order of holding time values. A field 316 is used in recording intermediate computations of holding time values used in connection with time slicing, as explained later herein.

In one embodiment of the invention, a scheme known as time slicing is employed. In accordance with that scheme, a slave processor 110 will return a process to the short holding time end of the PE Process queue 212 if the execution time exceeds a fixed time period, for example 10 milliseconds. Time slicing, as described herein, is done to prevent the starvation of some processes having shorter holding times. Other schemes to accomplish this objective, sometimes referred to as "aging", are known and may be used as well. In this illustrative system, the master processor 101 includes an interval interrupt source 118 which generates an interrupt once every 10 milliseconds. The interrupt signal is transmitted by wired conductors, which may be included in memory bus 131, to the slave processors 110. If a longer interval is desired, the 10 millisecond interrupt signals may be accumulated until a specified number of 10 millisecond periods have elapsed before execution of a segment is interrupted. The preferred time interval may be selected with reference to the execution characteristics of the work. If the selected interval is too short, the number of time slice interruptions become excessive. If the interval is too long, some short duration processes may suffer neglect. The first time that a segment of a process is partially executed and interrupted because of time slicing, the normally computed holding time for the executed segment is entered in the Cumulative Holding Time field 316 of the Process Table entry 301, shown in FIG. 3. The Cumulative Holding Time field 316 is used to accumulate the time spent in execution of a segment when the segment execution has been interrupted by time slicing. The value of this field is increased each time a segment is so interrupted. When a segment has been fully executed, the contents of the Cumulative Holding Time field is added to the last computed value of holding time and the sum is entered in the Holding Time field 315, shown in FIG. 3, before the process is entered on the Master process queue 211 by a slave processor. The master processor uses the contents of the Holding Time field in returning a process to the PE Process queue after completion of the necessary system level functions. A zero or another preselected holding time value is entered in the Holding Time field 315 when a slave processor returns the process to the PE Process queue 212, as a result of a time slice interrupt, thereby allowing other processes to, in effect, move toward the high end of the queue and be executed. Other schemes for reentering processes on the PE Process queue 212 may take into account the value of the accumulated holding time in order to gradually reduce the priority of the process.

FIG. 4 is a flow chart representation of the functions carried out by one of the processors in executing a segment of a process from the PE Process queue 212. Block 401 indicates the removal of a process from the PE Process queue. As indicated earlier, the PE Process queue is a double ended queue in which processes are entered in a non-descending order of holding time values. The slave processors 110 remove processes from the high end of the queue to execute processes with high holding time values. The master processor 101 removes processes from the low end of the queue to execute processes with low holding time values, when it has available time for user process execution. Block 402 indicates a reading of the process table 215, shown in FIG. 2, at the entry identified by the queue information. Block 403 of FIG. 4 indicates the resetting of the hardware timer 115 shown in FIG. 1. As stated earlier, the timer counter is incremented once every 10 microseconds and is read when execution of the segment of the process is terminated. Block 404 generally indicates execution of the user process until a system level function requiring the involvement of the master processor is encountered or process execution is interrupted due to time slicing, as described earlier herein. In decision block 410 a determination is made as to whether this is a timed interrupt due to time slicing. If not, the value of the timer that was reset in block 403 is added to the contents of the Cumulative Holding Time field 316 of the corresponding Process table entry (FIG. 3) and the result is entered in the Holding Time field 315 of that entry, as indicated in block 412. Thereafter, the process is entered on the Master Process queue 211, as indicated in block 414. If the execution of the user process was ended because of a timed interrupt introduced by the time slicing process, the value of the timer that was reset in block 403 is added to the Cumulative Holding Time field 316 of the corresponding Process table entry (FIG. 3) and a zero is entered in the Holding Time field 315 of that entry, as indicated in block 415. When execution of a user process is terminated by the timed interrupt, further user process execution is required. Hence, the process is entered in the PE Process queue 212 as indicated in block 416. Since its Holding Time value is zero, it is entered at the end of the queue corresponding to the low holding time values. Thereafter, the slave processor which was interrupted by time slicing may remove and execute another process from the other end of the PE Process queue 212.

It is to be understood that the above-described arrangement is merely illustrative of the application of the principles of the invention; numerous other arrangements may be devised by those skilled in the art without departing from the spirit and scope of the invention described herein. It is therefore intended that such changes and modifications be covered by the following claims.

We claim:

1. In a multiprocessor arrangement having a master processor and a slave processor, a method of allocating work to said slave processor and said master processor comprising the steps of:
    assigning an anticipated holding time value of a next segment to program processes to be executed, said program processes executable by either of said master processor or said slave processor;
    ordering said program processes in a double ended queue in a monotonically increasing order of anticipated holding time values;
    selecting processes for execution by said slave processor from the end of said queue having higher anticipated holding time values; and
    selecting processes for execution by said master processor from the end of said queue having lower anticipated holding time values.

2. In a multiprocessor system comprising a master and a slave processor, a method of scheduling execution of program processes each comprising at least one segment, by said master processor and said slave processor comprising the steps of:
    recording in a queue indicia identifying a plurality of processes to be executed each of which can be executed by either of said master or said slave processor;
    recording in association with each identified process an indication of anticipated execution time of a next segment;
    selecting for execution by said slave processor a process having recorded therewith an indication of a longer anticipated execution time than for other processes; and
    selecting for execution by said master processor a process having recorded therewith an indication of a shorter anticipated execution time than for other processes.

3. A method of scheduling execution of program processes in accordance with claim 2, wherein said step of recording an anticipated execution time comprises computing an execution holding time value for an associated process each time a segment of the associated process is executed and defining the computed value for executing a previous segment of the associated process as the anticipated execution time for a next segment of the associated process.

4. A method of scheduling execution of program processes in accordance with claim 2, wherein said step of recording an anticipated execution time comprises computing an execution holding time value for an associated process each time a segment of the associated process is executed and deriving an anticipated process execution time for a next segment of the associated process from a plurality of computed execution holding time values for the associated process.

* * * * *